(12) United States Patent
Bhat et al.

(10) Patent No.: US 12,008,444 B2
(45) Date of Patent: Jun. 11, 2024

(54) UNCLASSIFIED TRAFFIC DETECTION IN A NETWORK

(71) Applicant: Hewlett Packard Enterprise Development LP, Houston, TX (US)

(72) Inventors: Priyanka Chandrashekar Bhat, Karnataka (IN); Madhusoodhana Chari Sesha, Karnataka (IN); Rashmi Vedi, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 427 days.

(21) Appl. No.: 17/225,873

(22) Filed: Apr. 8, 2021

(65) Prior Publication Data
US 2021/0400067 A1    Dec. 23, 2021

(30) Foreign Application Priority Data
Jun. 19, 2020   (IN) .............................. 202041025981

(51) Int. Cl.
*H04L 29/06*      (2006.01)
*G06F 18/214*      (2023.01)
(Continued)

(52) U.S. Cl.
CPC .......... *G06N 20/00* (2019.01); *G06F 18/214* (2023.01); *G06F 18/23* (2023.01);
(Continued)

(58) Field of Classification Search
CPC ....... G06N 20/00; G06F 18/214; G06F 18/23; G06F 18/23213; G06F 18/24137;
(Continued)

(56) References Cited

U.S. PATENT DOCUMENTS 6,691,168 B1 * 2/2004 Bal ........................... H04L 9/40
370/428
7,136,926 B1 * 11/2006 Iyer ..................... H04L 63/0263
709/229

(Continued)

OTHER PUBLICATIONS

Ordonez, Clustering Binary Data Streams with K-means (Year: 2003).*

(Continued)

*Primary Examiner* — Samson B Lemma
*Assistant Examiner* — Richard W Cruz-Franqui
(74) *Attorney, Agent, or Firm* — Hewlett Packard Enterprise Patent Department (57) ABSTRACT

Examples include detection of unclassified traffic in a network. Some examples use an unsupervised machine learning mechanism for generating a first set of clusters of a first set of samples associated with a first set of time intervals, based at least in part on network traffic over a network, in a first predetermined period of time. Each sample associated with the respective time interval includes distribution of packets based on their packet lengths. In response to retrieving a second set of samples associated with a second set of time intervals, based at least in part on network traffic, a second set of clusters of the second set of samples is generated. It is determined whether one or more features of the second set of clusters vary as compared to one or more features of the first set of clusters of the first set of samples to detect unclassified traffic in the second set of samples.

20 Claims, 4 Drawing Sheets

(51) Int. Cl.
  *G06F 18/23* (2023.01)
  *G06F 18/23213* (2023.01)
  *G06F 18/2413* (2023.01)
  *G06N 20/00* (2019.01)
  *H04L 9/40* (2022.01)

(52) U.S. Cl.
  CPC .. *G06F 18/23213* (2023.01); *G06F 18/24137* (2023.01); *H04L 63/0236* (2013.01); *H04L 63/1416* (2013.01); *H04L 63/1425* (2013.01); *H04L 63/20* (2013.01)

(58) Field of Classification Search
  CPC ............. H04L 63/0236; H04L 63/1416; H04L 63/1425; H04L 63/20
  See application file for complete search history.

(56) References Cited

U.S. PATENT DOCUMENTS

| | | | |
|---|---|---|---|
| 7,516,364 B2 * | 4/2009 | Gooch .................. | H04L 69/161 714/34 |
| 8,117,486 B2 | 2/2012 | Handley | |
| 8,503,302 B2 | 8/2013 | Golic et al. | |
| 8,737,204 B2 | 5/2014 | Szabó et al. | |
| 9,729,571 B1 * | 8/2017 | Ferguson ............ | H04L 63/1408 |
| 2008/0019372 A1 * | 1/2008 | Mie .......................... | H04W 8/04 370/395.1 |
| 2014/0310396 A1 | 10/2014 | Hu et al. | |
| 2015/0229661 A1 * | 8/2015 | Balabine ............. | H04L 63/1425 726/22 |
| 2015/0289146 A1 * | 10/2015 | Ouyang ................ | H04L 47/127 370/252 |
| 2015/0341379 A1 * | 11/2015 | Lefebvre ............. | H04L 43/0894 726/22 |
| 2016/0218949 A1 * | 7/2016 | Dasgupta ............ | G06F 11/3409 |
| 2017/0099310 A1 | 4/2017 | Di Pietro et al. | |
| 2019/0007447 A1 * | 1/2019 | Barnes .................. | H04L 63/306 |
| 2020/0304393 A1 * | 9/2020 | Sampath ................ | G06N 20/00 |
| 2020/0410398 A1 * | 12/2020 | Zhu .......................... | H04L 67/12 |
| 2021/0168083 A1 * | 6/2021 | Somu .................. | H04L 47/2441 |
| 2021/0204146 A1 * | 7/2021 | Liu ....................... | H04W 28/06 |

OTHER PUBLICATIONS

Erman et al., Offline-Realtime Traffic Classification Using Semi-Supervised Learning (Year: 2007).*
McGregor et al., Flow Clustering Using Machine Learning Techniques (Year: 2004).*
Jain et al., Algorithms for Clustering Data (Year: 1988).*
Portnoy, Intrusion detection with unlabeled data using clustering (Year: 2000).*
Aggarwal et al., A Framework for Clustering Evolving Data Streams (Year: 2003).*
Erman et al., Traffic Classification Using Clustering Algorithms (Year: 2006).*
InnovationQ+ IP (Year: 2023).*
InnovationQ+ NPL Search (Year: 2023).*
NPL History Search (Year: 2024).*
Anderson, Blake, "Detecting Encrypted Malware Traffic (Without Decryption)", Cisco Blogs, available online at <https://blogs.cisco.com/security/detecting-encrypted-malware-traffic-without-decryption>, Jun. 23, 2017, 10 pages.
Cisco, "Cisco Traffic Anomaly Detector Module", Data Sheet, available online at <https://web.archive.org/web/20170829060015/https://www.cisco.com/c/en/US/products/collateral/interfaces-modules/catalyst-6500-7600-router-traffic-anomaly-detector-module/product_data_sheet0900aecd80220a6e.pdf>, 2007, 10 pages.
Liu et al., "Machine Learning and Deep Learning Methods for Intrusion Detection Systems: A Survey", MDPI, 2019, pp. 1-28.
Mantere et al., "Network Traffic Features for Anomaly Detection in Specific Industrial Control System Network", Future Internet, Sep. 25, 2013, 14 Pgs.
Nama et al., "Internet Traffic Measurement: Trends and Impact to Campus Network", INSIST, vol. 1, No. 1, Oct. 2016, 8 pages.
Scarpati, Jessica, "What is deep packet inspection (DPI)?", available online at https://searchnetworking.techtarget.com/definition/deep-packet-inspection-DPI, 2021, 5 pages.
Wikipedia, "k-means clustering", available online at <https://en.wikipedia.org/w/index.php?title=K-means_clustering&oldid=992354721>, December, 4, 2020, 17 pages.
Cisco, "Cisco DNA Center," Jan. 2022, https://web.archive.org/web/20200908164524/https://www.cisco.com/c/en/us/products/collateral/cloud-systems-management/dna-center/nb-06-dna-center-so-cte-en.html.

* cited by examiner

| PACKET LENGTH RANGE (BYTES) | COUNT OF PACKETS |
|---|---|
| 0-64 | 34187 |
| 65-127 | 6026780235 |
| 128-255 | 73403 |
| 256-511 | 345 |
| 512-1023 | 201196181 |
| 1024-1518 | 132910155 |
| 1519-2047 | 174 |
| 2048-4095 | 556607 |
| 4096-9216 | 0 |
| 9217-16383 | 174859 |

UNCLASSIFIED TRAFFIC DETECTION IN A NETWORK

CROSS REFERENCE TO RELATED APPLICATIONS

This application claims the priority benefit of India Patent Application No. IN202041025981, filed on Jun. 29, 2020, the contents of which are incorporated herein by reference in their entirety.

BACKGROUND

A network, also referred to as a computer network or a data network, is a digital communication network which allows nodes (e.g., computing devices, network devices, etc.) to share resources. In a network, nodes exchange data with each other using connections (e.g., data links) between nodes. These connections can be established over cable media such as wires or optic cables, or wireless media such as Wi-Fi.

Managing a network includes various rules and procedures to ensure traffic optimization, security and good end user experience. Secure running of a network may be considered a basic expectation from an organization's perspective considering that their business credibility may rely on it. Often, security measures and tools may be configured to monitor software and hardware running in a network and protect the network from internal and external security attacks. By ensuring security of a network, network management and scalability are enabled in a more efficient manner.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

DETAILED DESCRIPTION

Security measures and tools employed in a network provide visibility into the network to know the traffic types moving within the network, enable network administrators or automated processes to keep a constant eye on network traffic, and monitor applications, network performance, and analytics. Such security measures and tools may help in identifying unknown or suspicious traffic with abnormal behavior. Unknown traffic detection helps in identifying novel attacks, network failures or any misconfigurations in the network to understand the network traffic.

However, with the rapid growth of Internet of Things (IoT) devices and immense change in traffic trends, detecting unknown traffic is a challenging issue. With varied network deployments, conventional detection methods may not be reliable. For example, network monitoring tools like TCP stat gives only the state of packet length for all packets and network monitoring methods like Deep Packet Inspection scans an entire packet stream which requires huge computational power to process the traffic. Also, with scaling networks both in port bandwidth and port density it becomes difficult to sample the traffic for external monitoring.

The present disclosure provides systems and methods for detecting unclassified network traffic that may be used to identify any malicious activity in a network. The unclassified traffic may refer to traffic in a network that may not be expected to be observed by a network device in the network in a period of time. Unclassified traffic may be detected based on traffic trend that is expected to be observed by a network device in a period of time in the network. Knowing traffic trends in a period of time may help in identifying unclassified traffic in that period of time in the network. In an example, unclassified traffic may comprise unknown traffic in the network.

The described systems may track network traffic over a predetermined period of time and determine traffic trend in the network traffic based on the statistical properties and/or attributes, during that period of time. As network traffic may vary over time, traffic trends may vary during certain times of day, week or month. The described systems may retrieve a set of samples associated with a set of time intervals, based at least in part of the network traffic, for a predetermined period of time. Each sample may include distribution of packets based on their packet length. In an example, each sample may include a count of packets in different packet length ranges. The described systems may generate, using an unsupervised machine learning mechanism, a first set of clusters of the first set of samples and determine one or more features of the first set of clusters.

The described systems may continue to track the network traffic of the network over a second predetermined period of time, and retrieve a second set of samples associated with a second set of time intervals for the second predetermined period of time. A second set of clusters of the second set of samples may be generated using the unsupervised machine learning mechanism. The described systems may determine whether one or more features of the second set of clusters vary as compared to the one or more features of the first set of clusters to determine variation in distribution of the second set of samples as compared to that of the first set of samples. Upon determining variations in the one or more features of the second set of clusters from that of the first set of clusters, the described systems may detect unclassified traffic in the network. The described systems may periodically retrieve additional sets of samples and detect whether the network traffic includes unclassified traffic.

Figure 1:
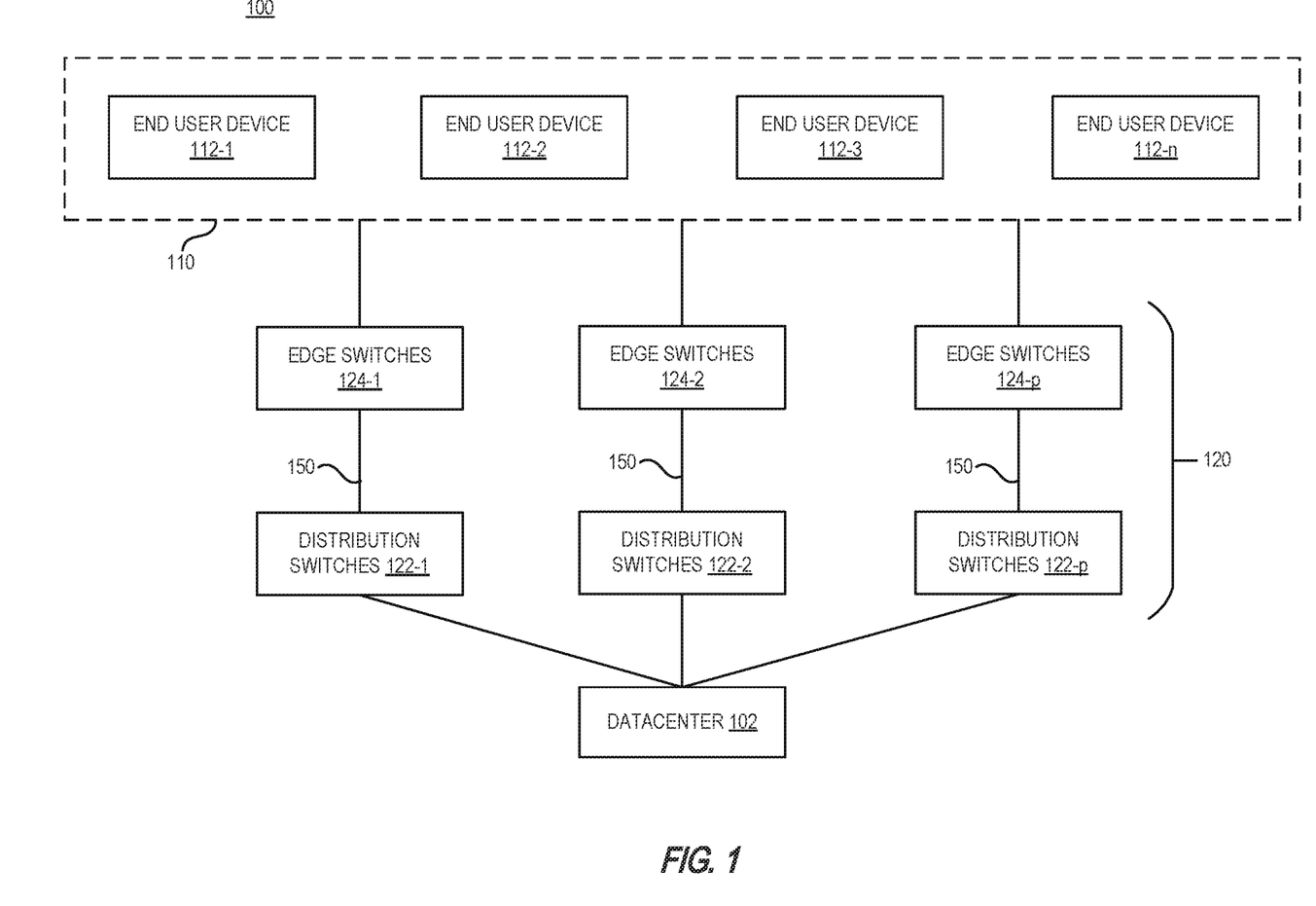
FIG. 1 illustrates an example network fabric for detecting unclassified traffic in a network.

FIG. 1 illustrates an example network fabric for detecting unclassified traffic in a network. As shown in FIG. 1, network fabric 100 may include a datacenter 102 including computing devices 110 and network devices 120 connected over a network 150. Although depicted as a single entity in FIG. 1, the datacenter 102 may comprise a plurality of geographically distributed computing devices configured to provide the core functionality for the network implementing the computing devices. In some examples, the datacenter 102 may provide cloud-based services to a number of computing devices 110. The network fabric 100 is provided for illustrative purposes only and should not be interpreted as limiting the scope of the technology only to the depicted network fabric topology. The technology disclosed herein is agnostic to the network topology implemented. A person of ordinary skill in the art would understand that the technology disclosed herein is applicable within any communications network regardless of the network topology implemented.

Network 150 can include, for example, a local area network (LAN) or a portion of a LAN. The computing devices 110 may create network traffic within the datacenter 102 by sending and receiving data via the network 150. Network devices 120 may observe the network traffic within network 150, such as by receiving the data sent and received by computing devices 110 as they perform their functions of network switching and/or network routing. Data may flow between the computing devices 110 and the datacenter 102 through network devices 120. A network device 120 may be any suitable network device, such as a router, a switch, an access point (e.g., a WiFi access point), and the like.

The computing devices 110 may include end user devices 112-1 to 112-n (collectively, "the end user devices 112"). Examples of end user devices 112 may include, but are not limited to, desktop computers, mobile computers, tablet computers (e.g., including e-book readers), mobile devices (e.g., a smartphone or PDA), set top boxes (e.g., for a television), video game consoles, or any other devices having appropriate processing circuitry, memory, and communications capabilities to connect to the network 150 and to send and receive data via the network 150. Other examples may include one or more Internet of Things (IoT) devices, such as connected appliances (e.g., smart refrigerators, smart watches, smart laundry machines, etc.), connected vehicles, connected thermostats, among others. The computing devices 110 may include any connected device that may download and/or upload data through the network 150. In some examples, computing devices 110 may include one or more network devices, such as one or more routers, switches, access points, and the like.

Network devices 120 may include distribution devices 122-1 to 122-p (collectively, "the distribution devices 122") and edge devices 124-1 to 124-n (collectively, "the edge devices 124") of the network fabric 100. Datacenter 102, distribution devices 122 and edge devices 124 may represent different layers of a communication network to which each computing device 110 can connect and communicate. Datacenter 102 may correspond to the core layer of network 150 implementing the network fabric 100, distribution devices 122 may correspond to an intermediate layer (e.g., a "fog" layer) of the network 150, and edge devices 124 may correspond to an edge layer of the network 150. The edge layer may correspond to a geographic boundary of the network. The intermediate layer may represent one or more devices configured to uplink the core layer and link down the edge layer. The intermediate layer may function to bridge the core layer and the edge layer, aggregating data flows from the edge layer and forwarding the information to the core layer. In FIG. 1, distribution switches 122 may aggregate data flow from edge devices 124 to datacenter 102. Examples of distribution devices 122 may comprise a switch, hub, router, bridge, gateway, or other network devices configured to connect the core layer with the edge layer in a network. In some examples, one or more distribution switches 122 may be directly connected to one or more servers of the datacenter 102, while in some examples one or more distribution switches 122 may be connected to a core layer switch, which is a high capacity switch positioned between the datacenter 102 or other devices of the core layer and the rest of the network fabric 100.

As discussed above, edge devices 124 may be positioned at a geographic edge of the network fabric 100. Edge devices 124 may provide a point of access for end user devices 112 to connect to the network 150, and may be the only devices of the network fabric 100 that directly interact with the end user devices 112. Edge devices 124 may include a switch, hub, router, bridge, gateway, or other networking device configured to connect the end user devices 112 with the network fabric 100 and to communicate with distribution devices 122.

Figure 2:
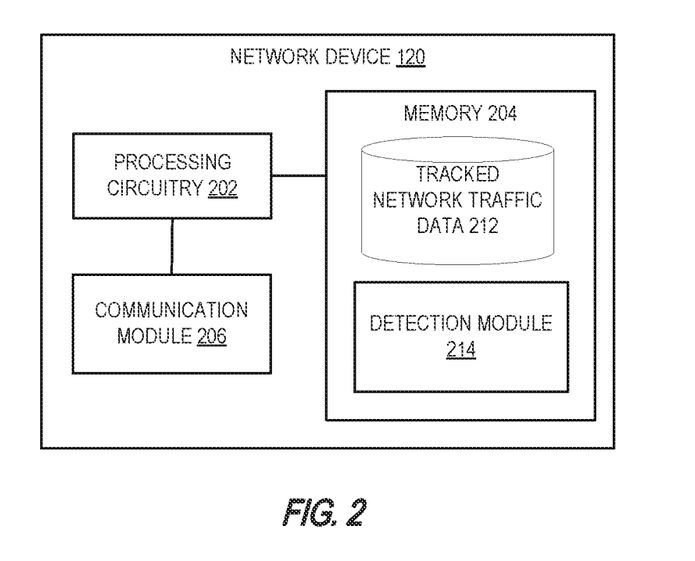
FIG. 2 is a block diagram illustrating an example network device in an example network fabric for detecting unclassified traffic in a network.

FIG. 2 is a block diagram illustrating an example network device 120 (e.g., edge device 124) in the network fabric 100 of FIG. 1. As shown in FIG. 2, network device 120 includes a processing circuitry 202 communicatively coupled to a memory 204 and a communication module 206. Memory 204 may be a storage device that may store information and machine-readable instructions that may be executed by processing circuitry 202. For example, memory 204 is a non-transitory machine-readable medium including instructions that, when executed by processing circuitry 202, cause network device 120 to undertake certain actions. As illustrated in FIG. 2, memory 204 includes tracked network traffic data 212 and detection module 214.

Communication module 206 may send and receive data over network 150 as network device 120 operates. For example, communications module 206 may send and receive data as part of performing its functionality as a switch, router, an access point or the like. Data sent and received by communication module 206 may form the network traffic observed by network device 120.

Tracked network traffic data 212 may include the network traffic tracked by the network device 120. Network device 120 may track at least a part of the network traffic within the network 150. In particular, network device 120 may track network traffic at each interface/port of the network device 120. Network device 120 may track the network traffic continuously over a predetermined period of time, and divide the tracked network traffic into a set of samples in respective time intervals during which network device 120 observes the network traffic. The predetermined period of time may be in hours, days, weeks or months. The time intervals may be preconfigured depending on the predetermined period of time, the network traffic and applications. Examples of time intervals may include ten minutes time intervals, fifteen minutes time intervals, thirty minutes time intervals, and the like. In an example, if network device 120 segments the network traffic tracked over an hour into fifteen minutes time intervals, network device 120 may group the network traffic that is tracked during the first fifteen minutes into a first time interval, the network traffic that is tracked during the second fifteen minutes into a second time interval, the network traffic that is tracked during the third fifteen minutes into a third time interval, and the network traffic that is tracked during the fourth fifteen minutes into a fourth time interval. Accordingly, the network device 120 may track a set of four samples over an hour.

Network device 120 may track the network traffic periodically or continuously for a plurality of predetermined periods of time as network device 120 operates.

Tracking network traffic within network 150 may include tracking packets (i.e., data packets) being sent and received within network 150. The network traffic may include packets that network device 120 observes via communications module 206 as it performs its functionality of network switching or routing. For example, network device 120 may observe packets sent and received by computing devices 110 (FIG. 1) or packets that are forwarded from one or more of computing devices 110.

As part of tracking the network traffic, network device 120 may determine distribution of packets observed by network device 120 based on their packet lengths. Packet length of a packet is the data size of the packet in bytes. Because packets in the network traffic may be of a variety of different data sizes depending on types of applications such as email, skype, web browsing etc., network device 120 may observe packets having different packet lengths. In an example, network device 120 may observe packets of packet lengths ranging from about 1 byte to about 16 k bytes.

In order to determine distribution of packets based on their packet lengths, network device 120 may determine a plurality of packet length ranges and a count of packets observed by the network device 120 in each packet length range. The count of packets in a packet length range observed by network device 120 during the respective time interval may be the number of times network device 120 observes packets of different packet lengths that correspond to that packet length range during the respective time interval. For example, if network device 120 observes, during a time interval, 500 packets of packet length 20 bytes and 500 packets of packet length 60 bytes, the count of packets in the packet length range 0 to 64 bytes is 1000 during the time interval.

Figure 3:
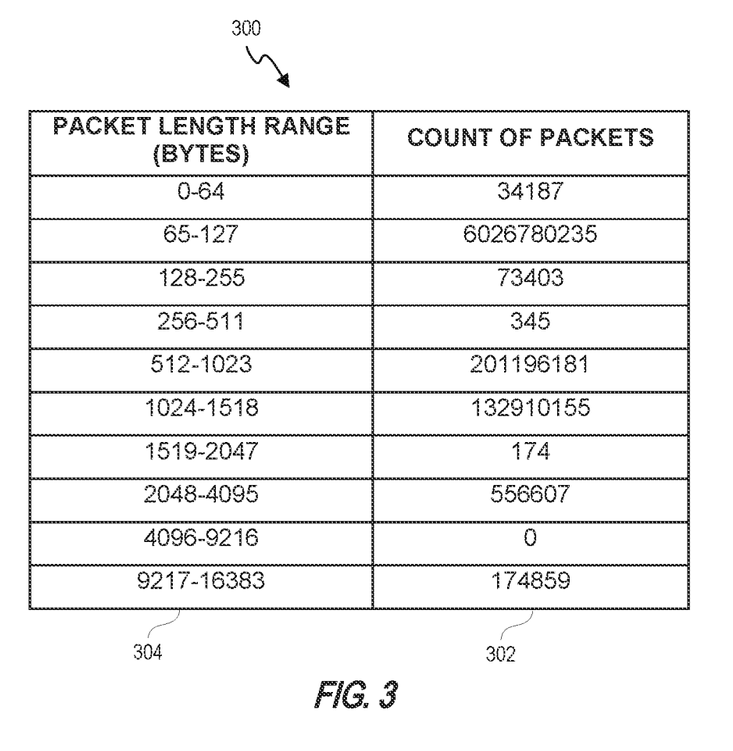
FIG. 3 illustrates an example sample showing counts of packets observed by an example network device in different packet length ranges during a time interval.

Network device 120 may track, in each sample of the set of samples, a count of packets it observes in each packet length range during the respective time interval. FIG. 3 illustrates an example sample 300 showing counts of packets 302 observed in different packet length ranges 304 by network device 120 during an example time interval.

Detection module 214 may comprise any system, device or apparatus that may detect any unclassified traffic in the network 150. In an example, detection module 214 may be implemented as a program of instructions that may be executed by a processing circuitry to detect any unclassified traffic in the network traffic observed by the network device 120.

Detection module 214 may retrieve a first set of samples associated with a first set of time intervals, over a first predetermined period of time, from tracked network traffic data 212. As described above, each sample of the first set of samples may include counts of packets observed in different packet length ranges for the respective time interval.

Once the first set of samples is retrieved, detection module 214 may generate, using an unsupervised machine learning mechanism, a first set of clusters of the first set of samples. In particular, detection module 214 may derive a set of training data for the unsupervised machine learning mechanism based on at least the portion of the first set of samples; and generate the first set of clusters of the first set of samples by inputting the set of training data into the unsupervised machine learning mechanism.

Detection module 214 may utilize a portion of the first set of samples as the set of training data for the unsupervised machine learning mechanism and may utilize the remaining portion of the first set of samples as a set of testing data for the unsupervised machine learning mechanism. For example, detection module 214 may utilize 80% of the first set of samples as the set of training data for the unsupervised machine learning mechanism and utilize the remaining 20% of the first set of samples as the set of testing data for the unsupervised machine learning mechanism.

In an example, the unsupervised machine learning mechanism is k-mean clustering algorithm. Detection module 214 may apply k-means clustering algorithm to generate the first set of clusters of the first set of samples. By generating the first set of clusters of the first set of samples, detection module 214 may assign each sample of the first set of samples to a cluster of the first set of clusters.

Each cluster may encompass a plurality of samples, and may be characterized by a position of centroid of the cluster, distribution of samples within the cluster and density of the cluster. Centroid of a cluster may be a mean or median of the samples in the cluster. Distance of each sample from the centroid in a cluster may define the distribution of samples within the cluster. Density of a cluster may be defined by a count of samples and their distribution within the cluster.

From the first set of clusters generated, the detection module 214 may determine one or more features of the first set of clusters. The one or more features determined by the detection module 214 may include a quantity of clusters in the first set of clusters, positions of the centroids of the clusters, density of each cluster or distribution of samples in each cluster. Detection module 214 may determine a count of samples and distance of each sample from the centroid of the cluster for determining the distribution and density of the cluster.

Determining one or more features of the first set of clusters may help in gauging trend of network traffic observed by the network device 120 in first predetermined period of time in the network 150. In an example, detection module 214 may retrieve various sets of samples for different periods of time such as working hours or non-working hours in an office and determine trends of network traffic in those periods of time.

Detection module 214 may retrieve a second set of samples, associated with a second set of time intervals, observed by the network device 120 in a second predetermined period of time. The second predetermined period of time may be same period of time in a day, week or month as the first predetermined period of time and the second set of time intervals may be same to the first set of time intervals such as ten minutes time intervals, fifteen minutes time intervals, thirty minutes time intervals, and the like. From the retrieved second set of samples, detection module 214 may generate a second set of clusters using unsupervised machine learning mechanism as described above and determine one or more features of the second set of clusters.

Detection module 214 may determine whether one or more features of the second set of clusters vary as compared to the one or more features of the first set of clusters to detect unclassified traffic. In particular, detection module 214 may identify any variation in one or more features of the second set of clusters as compared to the one or more features of the first set of clusters. For example, detection module 214 may identify any variation in a count of clusters of the second set of clusters and a count of clusters of the first set of clusters, a position of a centroid of a cluster of the second set of clusters and a position of a centroid of a cluster in the first set of clusters or a distribution of samples in a cluster of the second set of clusters and a distribution of samples in a cluster of the first set of clusters. In some examples, detection module 214 may identify any variation in a count of samples in a cluster of the second set of clusters and a count of samples in a cluster of the first set of clusters or distance of each sample from the centroid in a cluster of the second set of clusters and distance of each sample from the centroid of a cluster of the first set of clusters. In some examples, detection module 214 may determine any variation in density of a cluster of the second set of clusters and density of a cluster of the first set of samples.

By determining whether one or more features of the second set of clusters vary as compared to the one or more features of the first set of clusters, detection module 214 may compare the second set of clusters and the first set of clusters to determine any variation in the second set of samples observed over the second predetermined period of time as compared to trend of network traffic observed over the first predetermined period of time. In some examples, samples of the second set of samples may move from primarily being in one cluster of the first set of clusters to another cluster of the second set of clusters, or may move away from a particular cluster of the first set of clusters as observed in from the second set of clusters. In some examples, to determine whether the distribution of samples of the second set of samples in the second set of clusters is different from the distribution of the samples of the first set of samples in the first set of clusters, detection module 214 may determine whether the samples of the second set of samples fall within or outside of the first set of clusters.

Upon determining that one or more features of the second set of clusters vary as compared to the one or more features of the first set of clusters, detection module 214 may detect unclassified traffic. The unclassified traffic in the network 150 may be detected based at least in part on changes in the distribution of the second set of samples from the distribution of first set of samples. The changes may occur due to new applications being deployed at computing devices 110 or a potential security event occurred at network 150.

On detecting unclassified traffic by detection module 214, a security action may be performed. In some examples, detection module 214 may generate an alert. In response to the alert, an administrator may stop the network traffic to the interface/port of the network device 120. In some examples, the network device 120 may stop the network traffic to the interface/port of the network device 120 upon detecting unclassified traffic. This way, any suspected potential security event may be prevented or avoided.

In some examples, detection module 214 may periodically retrieve additional sets of samples from the tracked network traffic data 212 for predetermined periods of time, generate corresponding sets of clusters of the additional sets of samples and detect whether the network traffic includes unclassified traffic using the techniques as discussed above.

Figure 4:
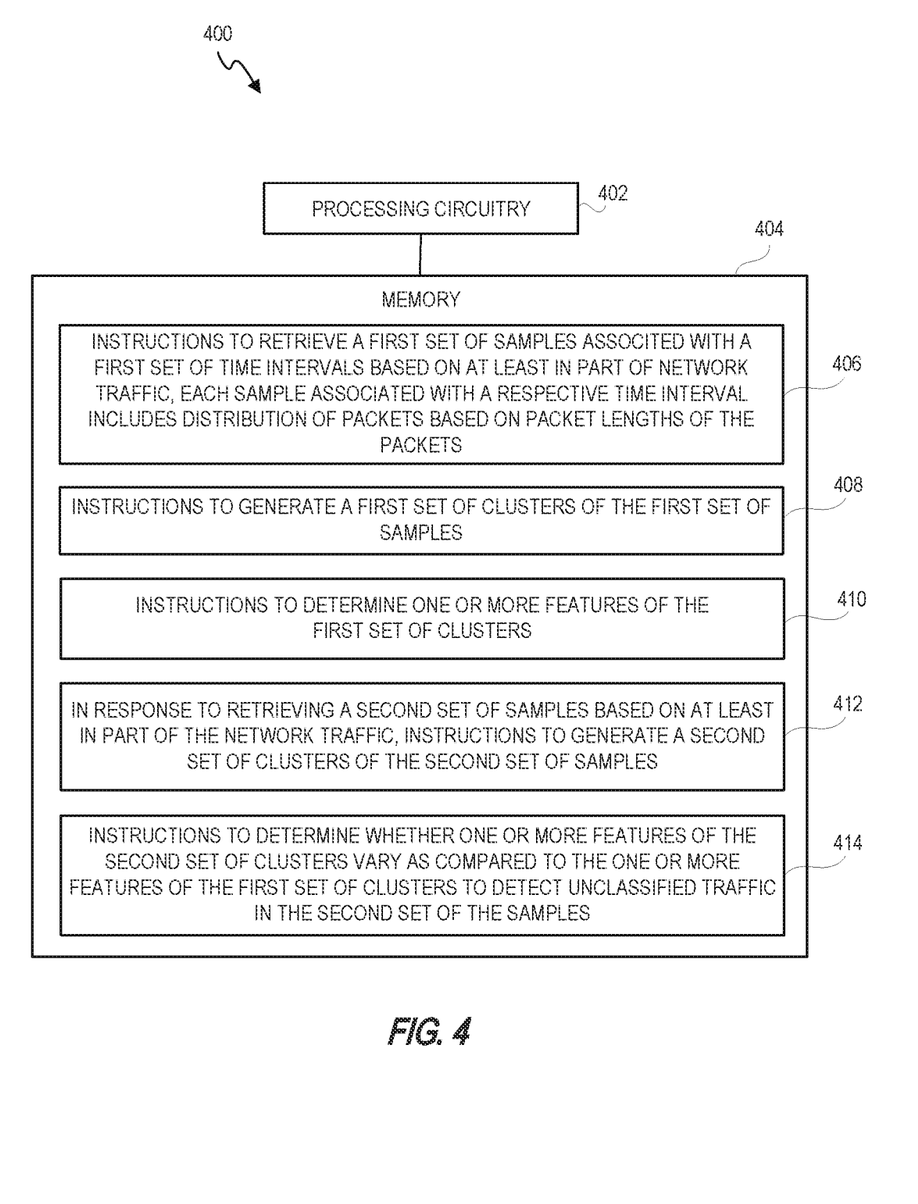
FIG. 4 is a block diagram depicting a processing circuitry and a memory encoded with example instructions for detecting unclassified traffic in a network.

FIG. 4 is a block diagram 400 depicting a processing circuitry 402 and a coupled to memory 404. Memory 404 is a non-transitory, computer-readable medium including instructions 406, 408, 410, 412 and 414 (406-414) to detect unclassified traffic in a network, in accordance with an example. The instructions 406-414 of FIG. 4, when executed by the processing circuitry 402, may implement some or all functions of a detecting module (e.g., the detecting module 214 of FIG. 2) for detecting unclassified traffic in the network traffic of a network. In some examples, the processing circuitry 402 and the memory 404 may be included in (e.g., as part of) a network device (e.g., network device 120 of FIG. 1). In some examples, the processing circuitry 402 and the memory 404 may be included in (e.g., as part of) each edge switch (e.g., edge switches 124) of FIG. 1. For ease of illustration, FIG. 4 will be described with reference to FIGS. 1 and 2. In certain examples, the instructions 406-414 may be executed for performing the functionalities of the detection module 214 and a method 500 described in FIG. 5.

Instructions 406 may be executed to retrieve a first set of samples associated with a first set of time intervals, based at least in part of network traffic in the network 150, in a first predetermined period of time. Each sample associated with respective time interval may include distribution of packets based on the packet lengths of the packets in the respective time interval. In an example, each sample may include counts of packets observed in different packet length ranges during the respective time interval.

Instructions 408 may be executed to generate a first set of clusters of the first set of samples using an unsupervised machine learning mechanism. In an example, k-mean clustering algorithm may be applied to generate the first set of clusters of the first set of samples.

Instructions 410 may be executed to determine one or more features of the first set of clusters. In an example, the one or more features may include a count of clusters, a position of the centroid of each cluster, a count of samples in each cluster, distance of each sample from the centroid of the cluster in each cluster, distribution of samples in each cluster, or density of each cluster.

Instructions 412 may be executed to generate a second set of clusters of a second set of samples associated with a second set of time intervals in a second predetermined period of time, in response to retrieving the second set of samples from the tracked network traffic data 212. In these examples, the second set of clusters is generated using the technique described w.r.t. generating the first set of clusters. Instructions 412 may include instructions that may be executed to determine one or more features of the second set of clusters.

Instructions 414 may be executed to identify whether one or more features of the second set of clusters vary as compared to the one or more features of the first set of clusters to detect unclassified traffic.

Additional instructions may be executed to perform a security action upon detecting unclassified traffic. In an example, additional instructions may be executed to generate an alert upon detecting unclassified traffic.

The instructions 406-414 may include various instructions to execute at least a part of the method described in FIG. 5 (described below). Also, although not shown in FIG. 4, the machine-readable medium 404 may also include additional program instructions to perform various other method blocks described in FIG. 5.

Figure 5:
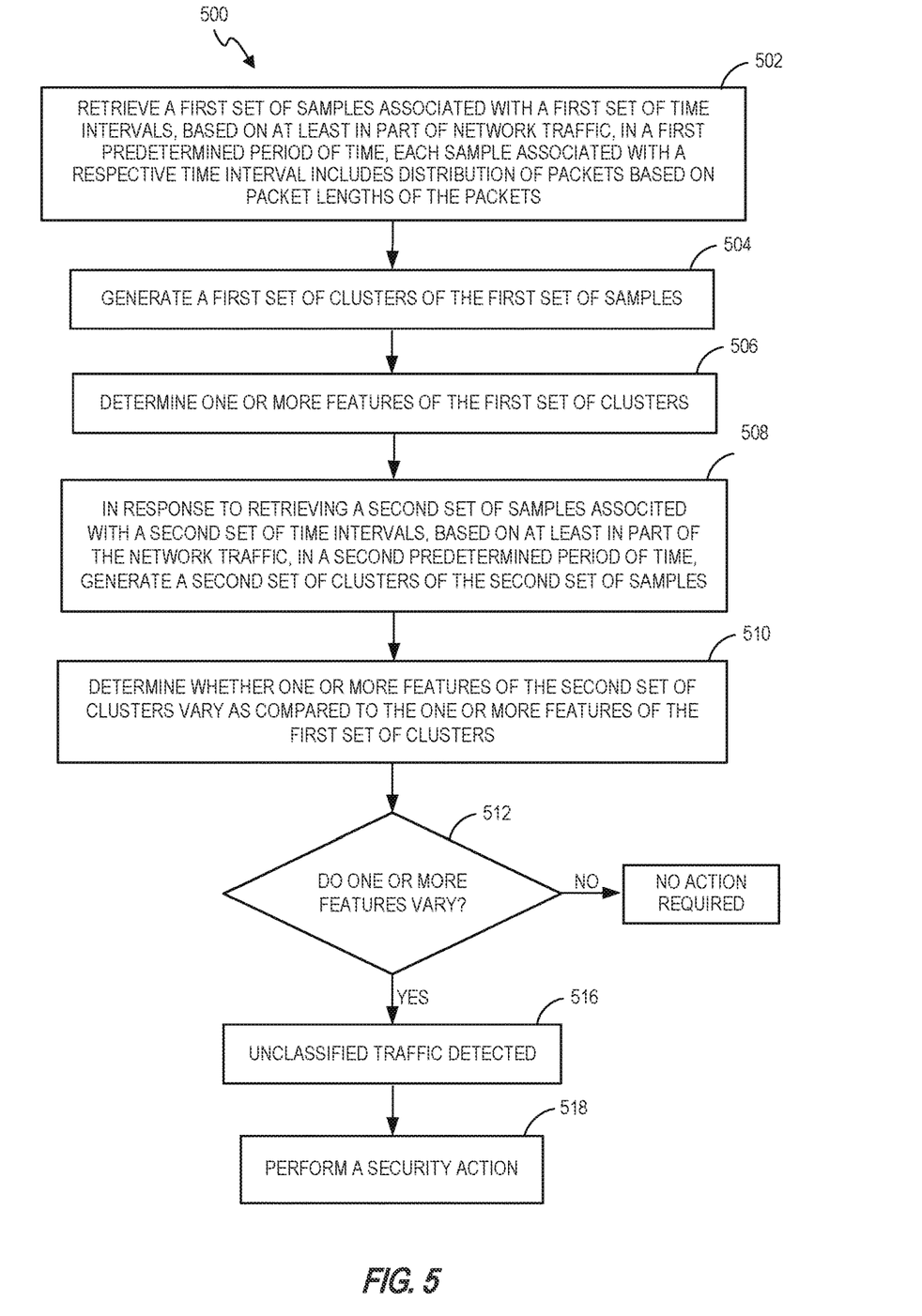
FIG. 5 is a flowchart illustrating an example method for detecting unclassified traffic in a network.

FIG. 5 is a flowchart illustrating an example method 500 for detecting unclassified traffic in a network. Method 500 may be stored as instructions in a memory and executed by a processing circuitry of a computing system such as a network device. For ease of illustration, the execution of method 500 is described in detail below with reference to FIG. 1. Although the below description is described with reference to the network device 120 in the network 150 of FIG. 1, however other devices suitable for the execution of method 500 may be utilized. Additionally, implementation of method 500 is not limited to such examples. Although the flowchart of FIG. 5 shows a specific order of performance of certain functionalities, method 500 is not limited to such order. For example, the functionalities shown in succession in the flowchart may be performed in a different order, may be executed concurrently or with partial concurrence, or a combination thereof.

In block 502, the method 500 may include retrieving a first set of samples associated with a first set of time intervals for a first predetermined period of time based at least in part of the network traffic in the network 150. The first set of samples may be retrieved from the tracked network traffic data 212 tracked by the network device 120. Each sample associated with the respective time interval may comprise distribution of packets based on the packet lengths of the packets. In an example, each sample may include counts of packets observed in different packet length ranges during the respective time interval.

In block 504, the method 500 may include generating a first set of clusters of the first set of samples using an unsupervised machine learning mechanism (described above). In some examples, generating, using the unsupervised machine learning mechanism, the first set of clusters of the first set of samples further includes deriving a set of training data for the unsupervised machine learning mechanism based on at least a portion of the first set of samples and generating the first set of clusters of the first set of samples by inputting the set of training data into the unsupervised machine learning mechanism. In some examples, the unsupervised machine learning mechanism may include a k-means clustering algorithm, and generating the first set of clusters of the first set of samples may include performing, using the k-means clustering algorithm, k-means clustering of the first set of samples. In some examples, the clusters of first set of clusters include a rare cluster, an even cluster, or a dense cluster.

In block 506, the method 500 may include determining one or more features of the first set of clusters. In an example, the one or more features of the first set of clusters may include a count of clusters, a position of the centroid of each cluster, density of each cluster, or distribution of samples in each cluster. In an example, one or more of a count of samples or distance of each sample from the centroid of the cluster may be determined for each cluster to determine the distribution and density of clusters.

In block 508, the method 500 may include in response to determining a second set of samples associated with a second set of time intervals, in a second predetermined period of time, from the network traffic, generating a second set of clusters of the second set of samples. The second set of clusters of the second set of samples may be generated using the unsupervised machine learning mechanism as described in the examples herein. In an example, one or more features of the second set of clusters may be determined.

In block 510, the method 500 may include determining whether the one or more features of the second set of clusters vary as compared to the one or more features of the first set of clusters of the first set of samples. In one example, the one or more features of the second set of clusters may be compared with the one or more features of the first set of clusters. In some examples, the one or more features of the second set of clusters may vary from the one or more determined features of the first set of clusters ('YES' at block 512). In these instances, in block 516, unclassified traffic may be detected in the second set of samples. In these examples, a security action may be performed. For example, an alert may be generated to indicate detection of unclassified traffic. In some examples, the network traffic at the respective interface/port of the network device 120 may be stopped to prevent or avoid any security attack that may be caused due to the unclassified traffic in the network traffic. In some examples, the one or more features of the second set of clusters may not vary from the one or more determined features of the first set of clusters ('NO' at block 512). In these instances, the network traffic may not include unclassified traffic. No action may be required in these instances.

In the examples described herein, the described systems and methods use the network traffic trends to detect unclassified traffic, which may be helpful in preventing and avoiding any security attack. In particular, the described systems and methods provide potential technical advantages over such condition-based programmatic techniques for detecting unclassified traffic. For example, because the described systems collect statistical properties and/or attributes associated with network traffic over multiple time intervals and utilize an unsupervised machine learning mechanism to determine traffic trend from such collected data, the described systems may be able to continuously observe network usage, recognize trends or patterns from such network usage, and transform the recognized trends or patterns into meaningful insights. In addition, the described systems are able to be used across a diverse variety of network deployments.

Processing circuitry is circuitry that receives instructions and data and executes the instructions. Processing circuitry may include application specific integrated circuits (ASICs), field programmable gate arrays (FPGAs), microcontrollers, central processing units (CPUs), graphics processing units (GPUs), microprocessing circuitrys, or any other appropriate circuitry capable of receiving instructions and data and executing the instructions. Processing circuitry may include one processing circuitry or multiple processing circuitrys. Processing circuitry may include caches. Processing circuitry may interface with other components of a device, including memory, network interfaces, peripheral devices, supporting circuitry, data buses, or any other appropriate component. Processing circuitrys of a processing circuitry may communicate to one another through shared cache, interprocessing circuitry communication, or any other appropriate technology.

Memory is one or more non-transitory computer-readable medium capable of storing instructions and data. Memory may include random access memory (RAM), read only memory (ROM), processing circuitry cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

We claim:

1. A computer implemented method, comprising:
    retrieving, from a network device, a first set of samples associated with a first set of time intervals, based at least in part on network traffic over a network, for a first predetermined period of time, wherein each sample associated with a respective time interval comprises a distribution of packets based on packet lengths of the packets;
    generating, using an unsupervised machine learning mechanism, a first set of clusters of the first set of samples;
    determining a first one or more features from the first set of clusters;
    in response to retrieving a second set of samples associated with a second set of time intervals, based at least in part on the network traffic, for a second predetermined period of time, generating, using the unsupervised machine learning mechanism, a second set of clusters of the second set of samples;
    determining a second one or more features from the second set of clusters;
    determining whether the second one or more features determined from the second set of clusters vary as compared to the first one or more features determined from the first set of clusters to detect unclassified traffic in the network traffic; and
    upon detecting the unclassified traffic, performing a security action,
    wherein each sample of the first set of samples associated with the respective time interval comprises counts of packets having byte lengths for different packet byte length ranges.

2. The computer implemented method of claim 1, wherein generating the first set of clusters of the first set of samples further comprises:
    deriving a set of training data for the unsupervised machine learning mechanism based on at least a portion of the first set of samples; and
    generating the first set of clusters of the first set of samples using the set of training data into the unsupervised machine learning mechanism.

3. The computer implemented method of claim 1, wherein the unsupervised machine learning mechanism comprises a k-means clustering algorithm and wherein generating the first set of clusters comprises performing, using the k-means clustering algorithm, k-means clustering of the first set of samples.

4. The computer implemented method of claim 1, wherein determining the first one or more features determined from the first set of clusters comprises determining a count of clusters, a position of centroid in each cluster or a distribution of samples in each cluster of the first set of clusters.

5. The computer-implemented method of claim 4, wherein determining whether the second one or more features determined from the second set of clusters vary as compared to the first one or more features determined from the first set of clusters comprises identifying variations in a count of clusters of the second set of clusters and a count of clusters of the first set of clusters, a position of a centroid of a cluster of the second set of clusters and a position of a centroid of a cluster in the first set of clusters or a distribution of samples in a cluster of the second set of clusters and a distribution of samples in a cluster of the first set of clusters.

6. The computer-implemented method of claim 1, further comprising:
    in response to periodically retrieving an additional set of samples associated with an additional set of time intervals, based at least in part on the network traffic over the network, for an additional predetermined period of time, generating, using the unsupervised machine learning mechanism, an additional set of clusters of the additional set of samples; and
    determining whether one or more features of the additional set of clusters vary as compared to the first one or more features determined from the first set of clusters to detect unclassified traffic in the network traffic.

7. The computer-implemented method of claim 1, wherein the unclassified traffic comprises a potential security event occurred at the network.

8. The computer-implemented method of claim 1, wherein performing the security action comprises generating an alert.

9. The computer-implemented method of claim 1, wherein performing the security action comprises stopping the network traffic.

10. A network device comprising:
    a processing circuitry; and
    a memory communicatively coupled to the processing circuitry and storing non-transitory machine-readable instructions that when executed cause the processing circuitry to:
        retrieve, from a network device, a first set of samples associated with a first set of time intervals, based at least in part on network traffic over a network, for a first predetermined period of time, wherein each sample associated with a respective time interval comprises a distribution of packets based on packet lengths of the packets;
        generate, using an unsupervised machine learning mechanism, a first set of clusters of the first set of samples;
        determine a first one or more features from the first set of clusters;
        in response to retrieving a second set of samples associated with a second set of time intervals, based at least in part on the network traffic, for a second predetermined period of time, generating, using the unsupervised machine learning mechanism, a second set of clusters of the second set of samples;

determine a second one or more features from the second set of clusters;

determine whether the second one or more features determined from the second set of clusters vary as compared to the first one or more features determined from the first set of clusters to detect unclassified traffic in the network traffic; and upon detecting the unclassified traffic, perform a security action, wherein each sample of the first set of samples associated with the respective time interval comprises counts of packets having byte lengths for different packet byte length ranges.

11. The network device of claim 10, wherein the instructions to generate the first set of clusters comprises instructions that cause the processing circuitry to:

derive a set of training data for the unsupervised machine learning mechanism based on at least a portion of the first set of samples; and generate the first set of clusters of the first set of samples by inputting the set of training data into the unsupervised machine learning mechanism.

12. The network device of claim 10, wherein the unsupervised machine learning mechanism comprises a k-means clustering algorithm, and wherein the instructions to generate the first set of clusters comprises instructions that cause the processing circuitry to perform, using the k-means clustering algorithm, k-means clustering of the first set of samples.

13. The network device of claim 10, wherein each sample of the first set of samples associated with the respective time interval comprises counts of packets in different packet length ranges.

14. The network device of claim 10, wherein the instructions to determine the first one or more features from the first set of clusters comprises instructions that cause the processing circuitry to determine a count of clusters, a position of centroid in each cluster or a distribution of samples in each cluster of the first set of clusters.

15. The network device of claim 14, wherein the instructions to determine whether the second one or more features determined from the second set of clusters vary as compared to the first one or more features determined from of the first set of clusters comprises instructions that cause the processing circuitry to identify variations in a count of clusters of the second set of clusters and a count of clusters of the first set of clusters, a position of a centroid of a cluster of the second set of clusters and a position of a centroid of a cluster in the first set of clusters or a distribution of samples in a cluster of the second set of clusters and a distribution of samples in a cluster of the first set of clusters.

16. The network device of claim 10, wherein the instructions further comprise instructions that cause the processing circuitry to:

in response to periodically retrieving an additional set of samples associated with an additional set of time intervals, based at least in part on the network traffic over the network, for an additional predetermined period of time, generate, using the unsupervised machine learning mechanism, an additional set of clusters of the additional set of samples; and determine whether one or more features of the additional set of clusters vary as compared to the first one or more features of the first set of clusters to detect unclassified traffic in the network traffic.

17. The network device of claim 10, wherein the instructions to perform the security action comprises instructions to generate an alert.

18. The network device of claim 10, wherein the instructions to perform the security action comprises instructions to stop the network traffic to a port of the network device.

19. A non-transitory machine-readable storage medium comprising machine-readable instructions executable by a processing circuitry to cause the processing circuitry to:

retrieve, from a network device, a first set of samples associated with a first set of time intervals, based at least in part on network traffic over a network, for a first predetermined period of time, wherein each sample associated with a respective time interval comprises a distribution of packets based on packet lengths of the packets;

generate, using an unsupervised machine learning mechanism, a first set of clusters of the first set of samples;

determine a first one or more features from the first set of clusters;

in response to retrieving a second set of samples associated with a second set of time intervals, based at least in part on the network traffic, for a second predetermined period of time, generating, using the unsupervised machine learning mechanism, a second set of clusters of the second set of samples; and determine a second one or more features from the second set of clusters;

determine whether the second one or more features determined from the second set of clusters vary as compared to the first one or more features determined from the first set of clusters to detect unclassified traffic in the network traffic, wherein each sample of the first set of samples associated with the respective time interval comprises counts of packets having byte lengths for different packet byte length ranges.

20. The computer implemented method of claim 1, wherein counting of packets having byte lengths within different packet byte length ranges comprises:

determining a plurality of packet byte length ranges; and counting numbers of packets having byte lengths for each packet byte length range of the plurality of packet byte length ranges.

* * * * *